(12) United States Patent
Mendenhall et al.

(10) Patent No.: US 6,424,381 B1
(45) Date of Patent: Jul. 23, 2002

(54) FILTERING DECIMATION TECHNIQUE IN A DIGITAL VIDEO SYSTEM

(75) Inventors: Todd C. Mendenhall; Darren D. Neuman, both of San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/105,971

(22) Filed: Jun. 26, 1998

(51) Int. Cl.[7] ............................................. H04N 9/74
(52) U.S. Cl. ...................... 348/581; 348/441; 348/458; 382/298; 382/299; 382/300
(58) Field of Search ............................... 348/581, 582, 348/561, 562, 704, 441, 458, 445, 565, 568; 382/258, 298, 299, 300; 345/127, 129; H04N 9/74, 11/20, 7/01

(56) References Cited

U.S. PATENT DOCUMENTS

| | | | |
|---|---|---|---|
| 5,485,216 A | * | 1/1996 | Lee ............................ 348/443 |
| 5,491,521 A | * | 2/1996 | Boie et al. .................. 348/626 |
| 5,519,446 A | * | 5/1996 | Lee ............................ 348/402 |
| 5,619,438 A | * | 4/1997 | Farley et al. ............. 364/724.1 |
| 6,064,450 A | * | 5/2000 | Canfield et al. ............ 348/845 |
| 6,104,753 A | * | 8/2000 | Kim et al. .................. 348/403 |
| 6,175,592 B1 | * | 1/2001 | Kim et al. .................. 348/403 |

* cited by examiner

*Primary Examiner*—John Miller
*Assistant Examiner*—Trang U. Tran
(74) *Attorney, Agent, or Firm*—Conley, Rose & Tayon

(57) ABSTRACT

A video decoder decimates an input image to produce a decimated output image. The video decoder uses approximately every line of pixels in the input image to compute the lines of pixels in the decimated image. The video decoder includes a vertical decimation filter that computes an average, and preferably a weighted average, of luminance (luma) values associated with pixels from each of four lines in the input image. The decimation filter preferably computes a weighted average of lumas from four adjacent lines of pixels from the input image which may represent a frame or a field of video data. The weighted average preferably uses coefficients that weight each luma in the calculation differently. After calculating all of the luma values for a particular line of the decimated image, the line number associated with the first of the four adjacent lines is incremented by four (in a field-based system) to determine the initial line number for calculating the next line in the decimated image. The new initial line number thus represents the first line number of the set of four adjacent lines used to calculate the new line in the decimated image. This technique advantageously results in a high quality decimated image because each line from the initial image is used to compute the decimated image.

19 Claims, 4 Drawing Sheets

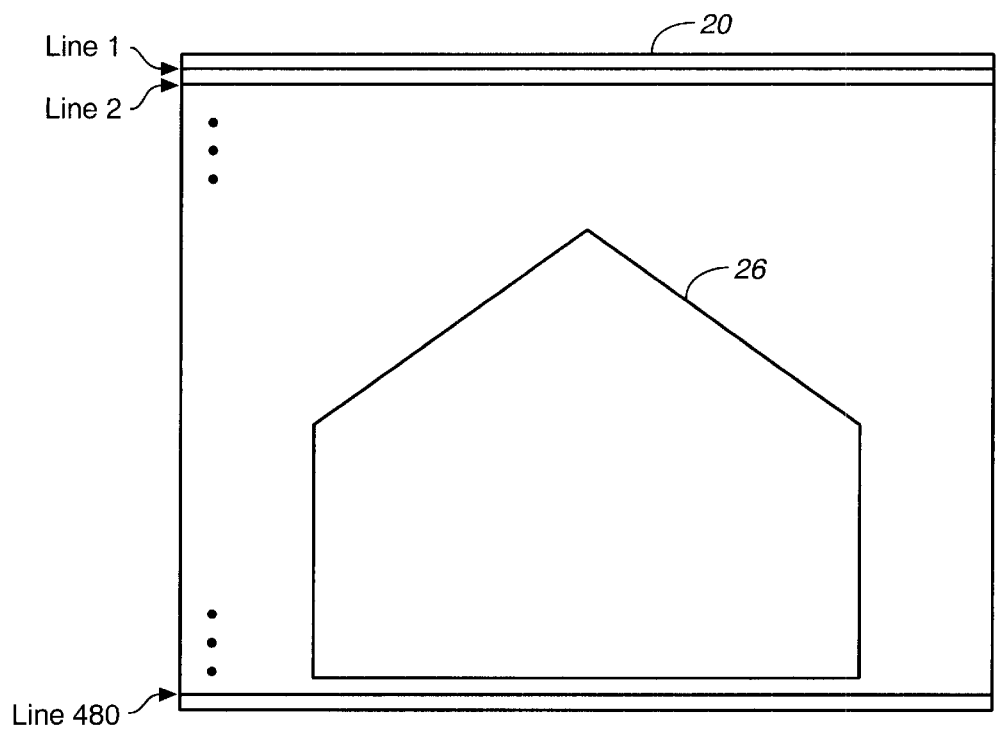
FIG._1
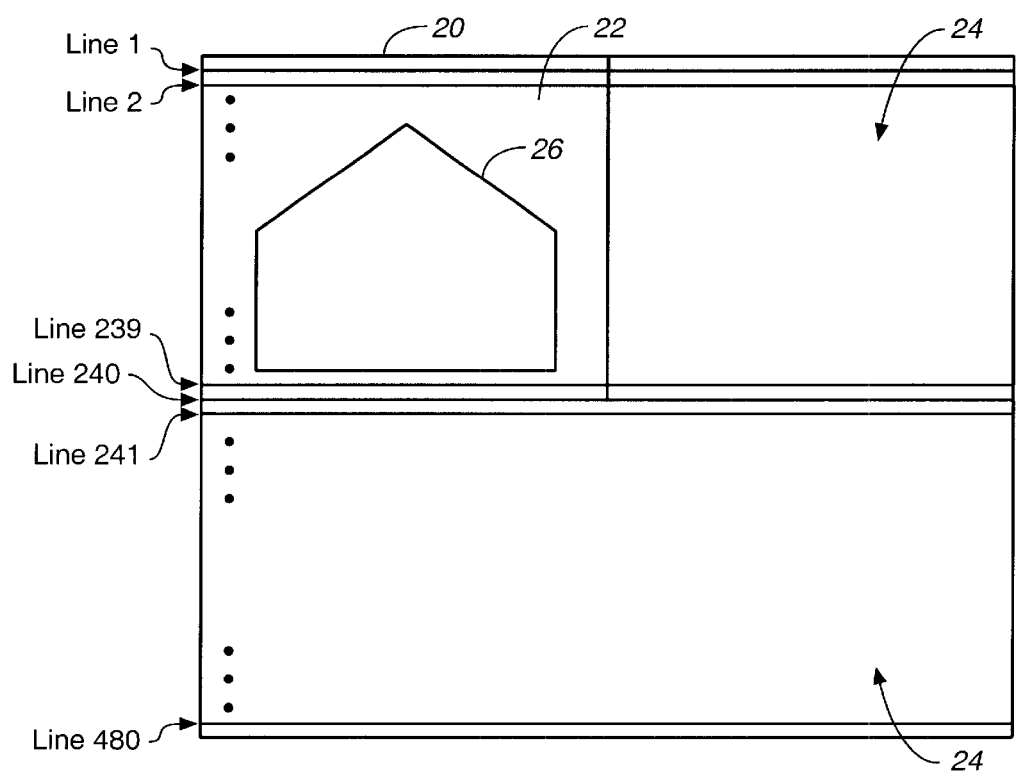
FIG._2

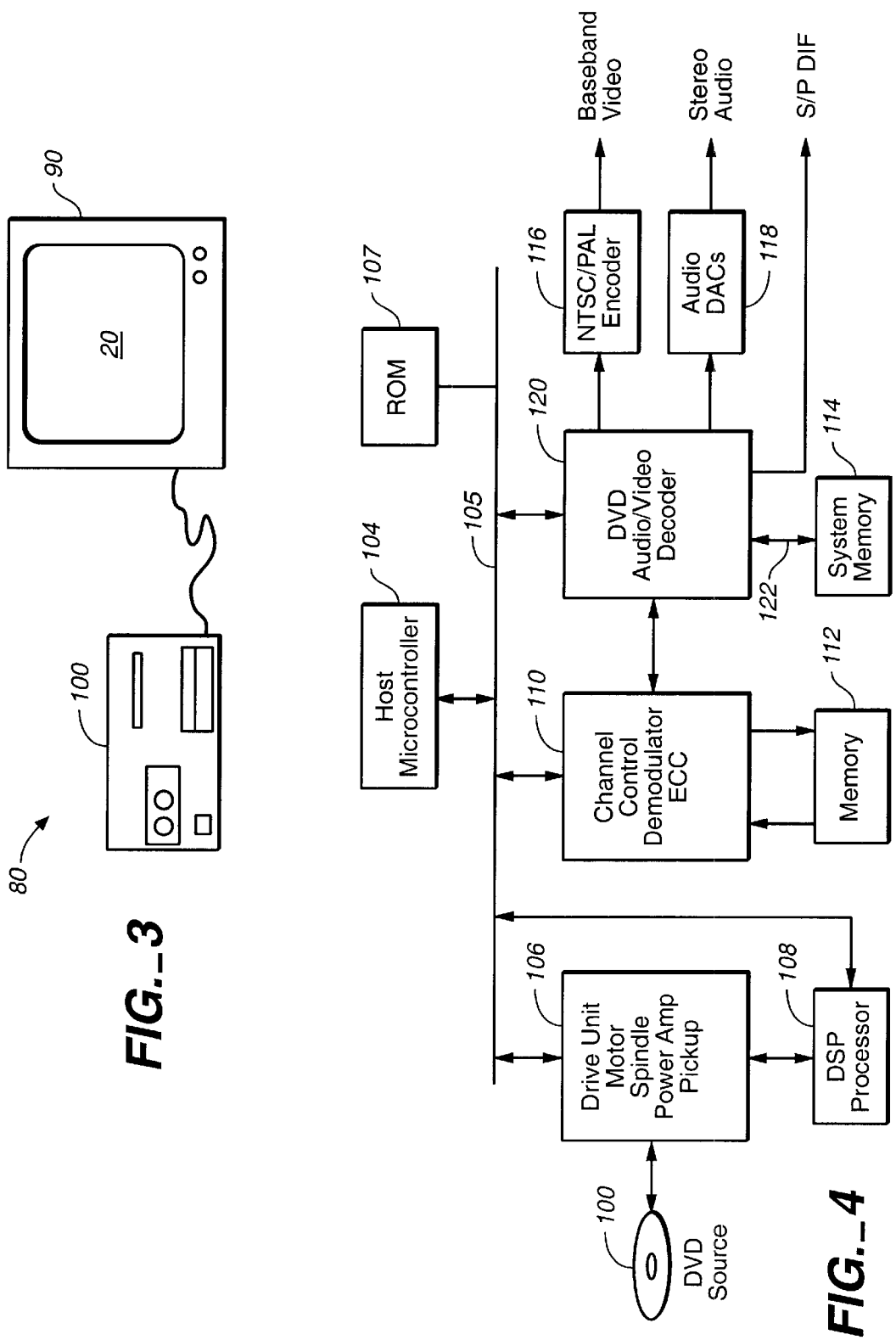

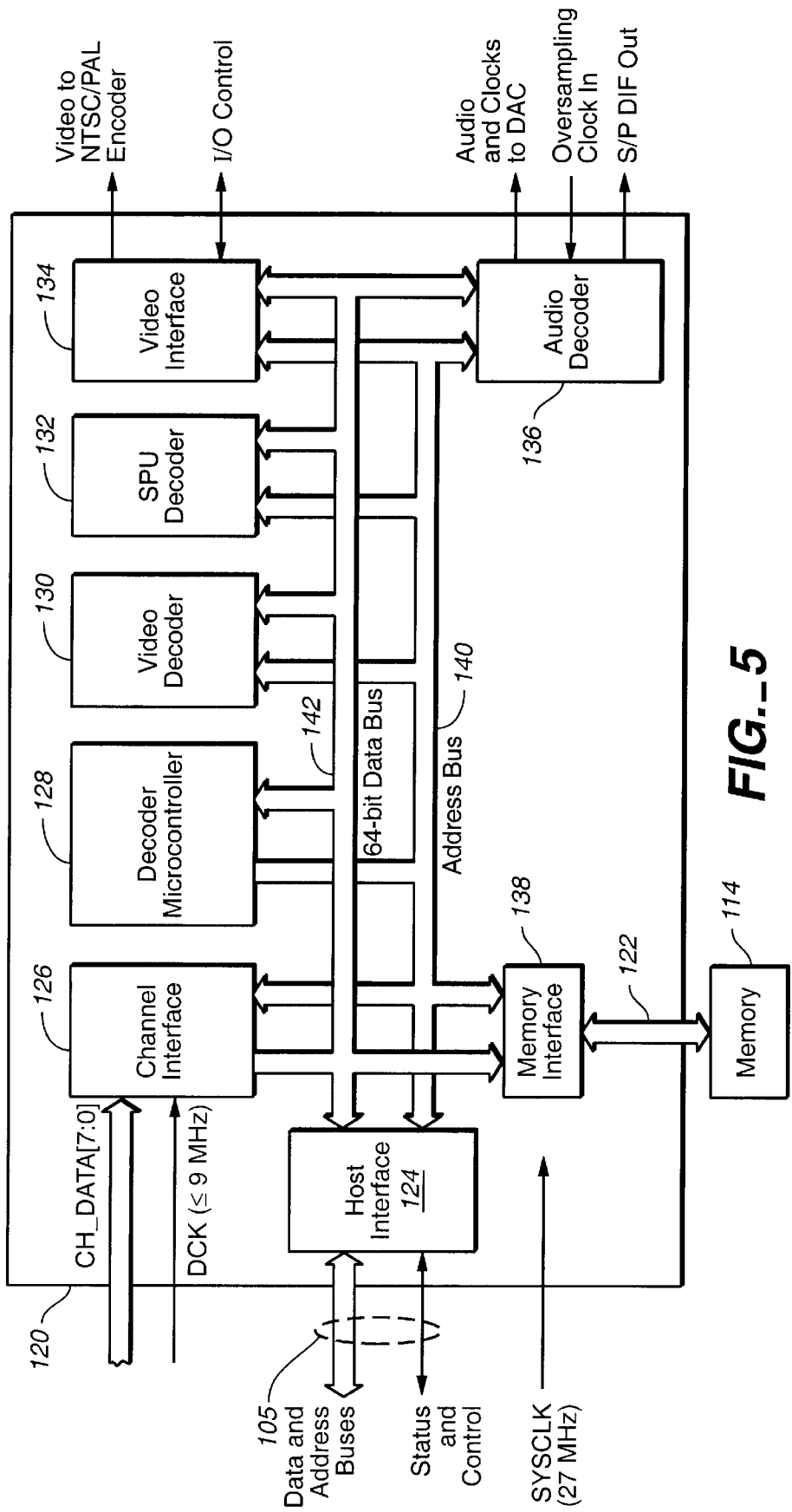
FIG._5

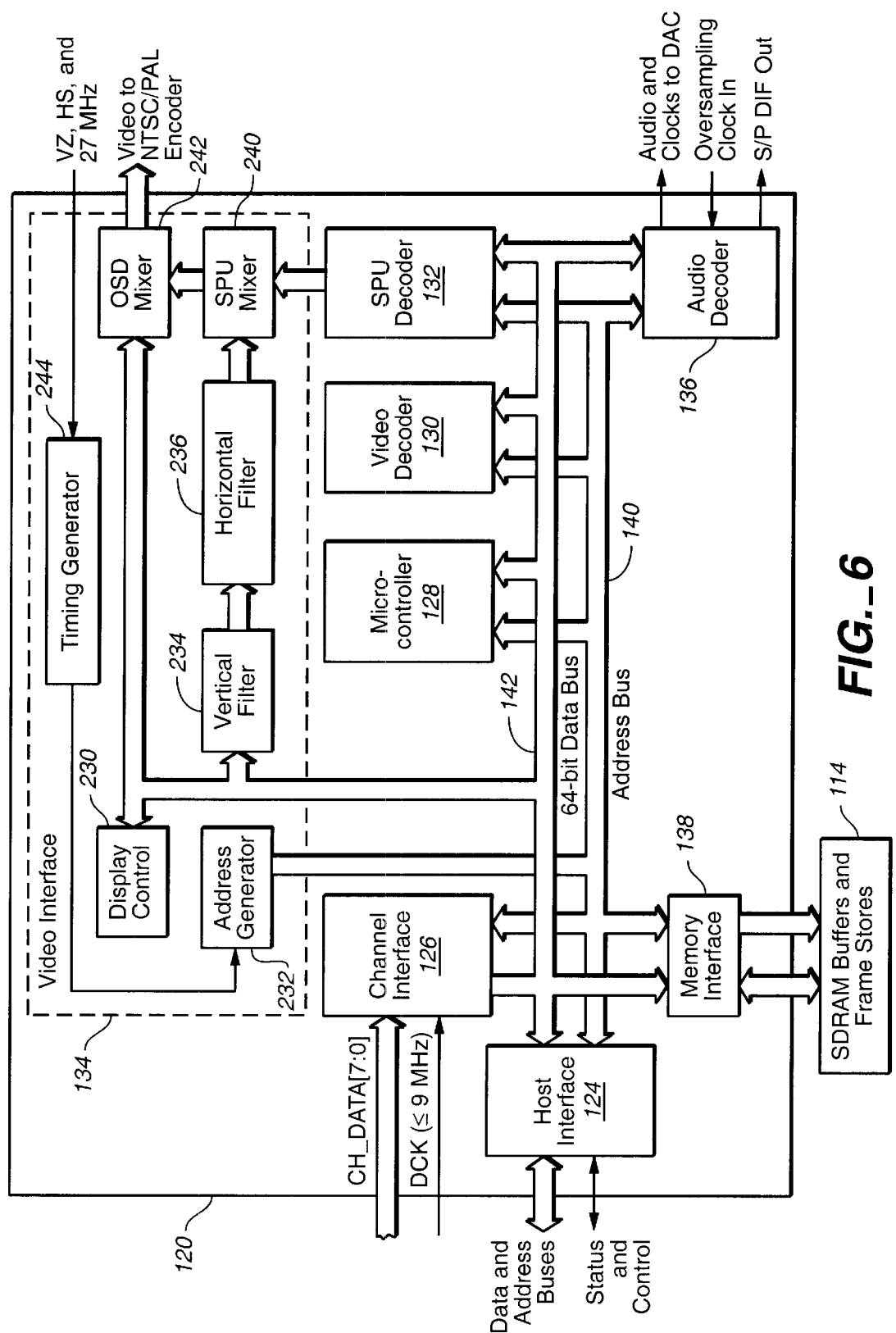
FIG._6

FILTERING DECIMATION TECHNIQUE IN A DIGITAL VIDEO SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to video processing systems. More particularly, the present invention relates to filtering pixel data in a video processing system. More particularly still, the invention relates to technique for decimating a digital video image.

2. Background of the Invention

The consumer electronics industry has experienced a dramatic explosion in product development over the last 20 years. This explosion has been fueled by consumer demand coupled with significant advances in semiconductor technology that have lead to lower cost semiconductor devices incorporating significantly more functionality than previously possible. For example, a hand-held calculator from 20 years ago provided the ability to perform rudimentary mathematical operations. Today, a hand-held device can provide much of the functionality of a desktop computer system.

The visual display of information to the user is of particular importance to the consumer electronics industry. The most notable examples of visual displays include televisions and personal computers. Other types of consumer electronics, including stereo receivers and hand-held computers, also include visual displays. FIG. 1, for example, shows a typical video screen 20 such as may be used in television or personal computer systems. An object 26 is shown on the screen which generally includes multiple lines of pixels. A typical television format includes 480 lines of pixels (LINE 1, LINE 2, ..., LINE 480), with each line comprising 720 pixels. The size and spacing of the pixel lines in FIG. 1 have been exaggerated for clarity.

Each pixel in a line is represented by one or more data values. For example, each pixel can be represented in a "RGB" format which includes red, green, and blue color components. Alternatively, each pixel can be represented in a "YUV" or "YCrCb" format. In either the YUV or YCrCb formats, the "Y" value represents luminance ("luma") which determines the brightness of the pixel. The U and V values represent chrominance ("chroma") components which determine color and are calculated as the difference between the luminance components and the red and blue color values; that is, U=Y−R and V=Y−B. The Cr and Cb values also represent chrominance and are scaled versions of the U and V chrominance values.

Video systems often represent images digitally. That is, each pixel comprising the image is represented by a digital YCrCb value, or a value in accordance with another format. To facilitate the transmission and storage of moving pictures, which generally involve voluminous amounts of pixel data, various encoding and compression techniques are used to process the data. One such technique is the Moving Pictures Experts Group (MPEG) standard commonly implemented in digital video disk (DVD) drives and other types of video equipment.

It is often desirable to display other information on the screen besides the video itself. For example, it may desirable to display textual information on one portion of the display and video on another portion. Additionally, it may desirable to show simultaneously two different video images on different portions of the display. For example, two different television stations could be viewed simultaneously, or a television signal could be viewed on one part of the screen while a DVD video signal is displayed on another part.

Video signals that have been digitally encoded are generally encoded for subsequent viewing in a full screen format. Thus, if a video signal is to be shown on a television screen which has 480 lines of pixels, the signal is encoded in the full 480 line format. After decoding, the signal is ready to be viewed in the full 480 line format. If other information is to be shown simultaneously on the screen, it is preferable to reduce ("decimate") the size of the image so that it can be shown with fewer lines and columns of pixels. Decimating an image makes room for other information on the screen. The present invention generally relates to a technique for vertically decimating a digital video image.

One decimation technique that has been suggested involves "line dropping" in which predetermined lines of pixel values are omitted (i.e., dropped) from the initial image. If it desired to reduce the vertical dimension of an image by a factor of two from 480 lines to 240 lines, line dropping would involve dropping all of the even numbered lines (lines 2, 4, 6, etc.) from the image and retain the odd numbered lines, or vice versa (dropping the odd lines and retaining the even lines). Although a fast technique, line dropping results in an inferior quality image because the resulting image is based on only half of the lines comprising the original image.

Thus, an improved decimation technique is needed that creates higher quality images than is possible with line dropping techniques. Such a technique preferably would in some way take into account every line of pixels from the original image in generating the decimated image. Despite the advantages such a system would offer, to date no such system is known to exist.

BRIEF SUMMARY OF THE INVENTION

The deficiencies noted above are solved in large part by a video decoder that decimates an input image to produce a decimated output image. The video decoder uses approximately every line of pixels in the input image to compute the lines of pixels in the decimated image. In accordance with the preferred embodiment, the video decoder includes a vertical decimation filter that computes an average, and preferably a weighted average, of luminance (luma) values associated with pixels from each of four lines in the input image. The decimation filter preferably computes a weighted average of lumas from four adjacent lines of pixels from the input image which may represent a frame or a field of video data. The weighted average preferably uses coefficients that weight each luma in the calculation differently.

After calculating all of the luma values for a particular line of the decimated image, the line number associated with the first of the four adjacent lines is incremented by four (in a field-based system) to determine the initial line number for calculating the next line in the decimated image. The new initial line number thus represents the first line number of the set of four adjacent lines used to calculate the new line in the decimated image. This technique advantageously results in a high quality decimated image because each line from the initial image is used to compute the decimated image (i.e., no line is dropped without being used to compute the decimated image).

These and other advantages will become apparent once the following disclosure and accompanying drawings are read.

BRIEF DESCRIPTION OF THE DRAWINGS

For a detailed description of the preferred embodiments of the invention, reference will now be made to the accompanying drawings in which:

FIG. 1 shows a full screen image on a display;

FIG. 2 shows the image of FIG. 1 decimated to a quarter screen size in accordance with the preferred embodiment of the invention;

FIG. 3 shows a DVD drive connected to a display;

FIG. 4 is a block diagram of the DVD drive of FIG. 3 constructed in accordance with the preferred embodiment;

FIG. 5 shows a block diagram of a preferred embodiment of an audio/video decoder included in the DVD drive of FIG. 4; and FIG. 6 is a block diagram of a video interface included in the audio/video decoder of FIG. 5 including a vertical filter constructed in accordance with the preferred embodiment.

Certain terms are used throughout the following description and claims to refer to particular system components. As one skilled in the art will appreciate, video system companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The present invention involves a technique for decimating a video image. The preferred embodiment of the invention described below is used to implement quarter screen decimation in which an input image, such as that shown as object 26 in FIG. 1, is reduced to one-quarter of its size as shown in FIG. 2. Quarter screen decimation generally involves reducing both the vertical and horizontal dimensions of the input image by a factor of two. The preferred embodiment addresses the process of vertically decimating the input image. The vertical decimation technique described herein is intended to be used in conjunction with a conventional horizontal decimation technique. The order of the horizontal and vertical decimation steps is generally not important—the image can be horizontally decimated first and then vertically decimated, or vice versa. Further, the principles of the preferred embodiment can be readily adapted to other magnitudes of decimation (e.g., half screen decimation, three-quarter screen decimation, etc.) and the claims that follow are intended to embrace all such variations.

The resulting quarter screen decimated image in FIG. 2 generally occupies the upper left-hand quadrant 22 of the screen 20. The remaining area 24 comprising the other three quadrants is available for displaying other text and video information as desired. As described below, the decimation technique reduces the vertical size of the original image from 480 lines to 240 by averaging together lines of pixels. Each of the 480 lines of pixels from the original image is used at least once, preferably at least twice, to decimate the image. By using all of the lines of pixels, the decimation technique of the preferred embodiment generates higher quality decimated images than decimated images created using a line dropping technique.

Referring now to FIG. 3, video system 80 constructed in accordance with the preferred embodiment generally includes a display device 90 coupled to a video player 100. Video player 100 will be described throughout this disclosure as a digital video disk (DVD) system. The principles of the present invention, however, can be applied to other types of video equipment such as videocassette recorders and laser disc drives, to name a few. Moreover, the invention can be adapted to any type of video equipment that includes vertical filtering of pixel data. Display device 90 preferably is a television set or other type of monitor. Further, DVD system 100 could be incorporated into a personal computer system and thus could be coupled to a computer display.

Referring now to FIG. 4, DVD system 100 preferably includes a host microcontroller 104, a drive unit motor/spindle power amplifier/pickup 106, read only memory (ROM) 107, a DSP processor 108, a channel controller demodulator/ECC 110, memory 112, memory 114, NTSC/PAL encoder 116, audio digital-to-analog converters 118, and a DVD audio/video decoder 120. Alternatively, the audio and video processing functions of audio/video decoder 120 can be implemented with separate devices. Thus, audio/video decoder 120 can be replaced with a video processor, and an audio processor could be included as part of DVD drive 100 as a separate component.

The host microcontroller 104 couples to the drive unit motor spindle power amplifier pickup 106, DSP processor 108, channel control demodulator/ECC 110, and DVD audio/video decoder 120 via a bus 105 which includes data and address busses and status and control signals. The bus is implemented with any suitable protocol commonly available or custom designed. In accordance with the preferred embodiment, DVD system 100 is capable of receiving and processing MPEG video and audio data. The DVD system can implement either the MPEG-1 or MPEG-2 decoding techniques. Alternately, DVD system 100 can be adapted to process data compressed according to other techniques besides MPEG if desired.

A DVD disk 102 can be inserted into DVD system 100. The DVD audio/video decoder 120 generally receives demodulated, coded audio and video data from the DVD disk 102 through the channel control demodulator/ECC 110 and produces a decoded audio and video output data stream to the NTSC/PAL decoder 116 (for video) and audio digital-to-analog converters 118 (for audio). The DVD audio/video decoder 120 also provides a Sony/Philips digital interface (S/P DIF) formatted output stream which is a format commonly known to those of ordinary skill.

The host microcontroller 104 preferably can be any general purpose microcontroller, such as those made by Intel or Motorola. The host microcontroller 104 generally controls the operation of the DVD system. The microcontroller 104 executes an initialization routine to test the system's components during power up and responds to functions selected by the user through input controls (not shown).

The memory 114 preferably is implemented as synchronous dynamic random access memory (SDRAM), although other types of memory devices can be used as well, such as conventional DRAM and extended data out DRAM (EDO DRAM). In accordance with the preferred embodiment, memory 114 comprises a SDRAM device with a 16 Mbit capacity and an 81 MHz clock speed capability. Examples of suitable SDRAM devices include the KM416S1120A manufactured by Samsung or the upD4516161 manufactured by NEC. Further, and if desired, memory 114 may be implemented as two or more SDRAM modules. Thus, if two 16 Mbit SDRAM devices are used, the total memory capacity of memory 114 is 32 Mbits.

The ROM 107 preferably is used to store on-screen display data as well as other configuration information and code. During system initialization, the host microcontroller 104 transfers a copy of the OSD data sets from ROM 107 across bus 105 through the DVD audio/video decoder 120 and into memory 114. The DVD audio/video decoder 120 receives video data from the channel control demodulator/ECC 110 and OSD data from memory 114. The DVD audio/video decoder 120 then mixes the OSD data with the video signals and provides a video output signal to the NTSC/PAL encoder 116.

Drive unit motor motor/spindle power amplifier/pickup 106 generally includes motors to spin the DVD disk 102 and includes read heads to read data from the disk 102. Drive unit motor 106 may also include write heads for writing data to disk 102. Any suitable type of drive unit motor motor/spindle power amplifier/pickup can be used.

Referring still to FIG. 4, the DSP processor 108 provides filtering operations for write and read signals, and acts a controller for the read/write components of the system (not specifically shown). The DSP controller 108 controls the drive motors included in the drive unit motor motor/spindle power amplifier/pickup 106. The DSP processor 108 may be implemented as any suitable DSP processor.

The channel controller demodulator/ECC 110 preferably decodes and buffers the read data from the DVD disk 102 in order to control the rate of the video and audio bitstreams. The channel controller demodulator/ECC 110 also includes an error correction code (ECC) decoder to decode the demodulated signal. Any suitable channel control demodulator/ECC can be used.

The NTSC/PAL encoder 116 receives processed digital video data from audio/video decoder 120 and generally converts the received video bitstream to a predefined analog format. The encoder 116 typically comprises an NTSC/PAL rasterizer for television, but may also be a digital-to-analog converter for other types of video formats. The audio digital to analog converts 118 receive a digital representation of the audio signal from the audio/video decoder 120 and, according to known techniques, converts the signal into an analog audio signal that can be played through a speaker.

Referring now to FIG. 5, the audio/video decoder 120 preferably includes a host interface 124, a channel interface 126, a decoder microcontroller 128, a video decoder 130, a sub-picture unit (SPU) decoder 132, a video interface 134, an audio decoder 136, and a memory interface 138. As shown, these components are coupled together via a 64-bit data bus 142 and an associated address bus 140. The interface to the channel control demodulator/ECC 110 is provided by the channel interface 126. The interface to bus 105, and thus host microcontroller 104 is provided by host interface 124. The memory interface 138 provides the interface for the decoder 120 to memory 114. The video interface 134 generates video data to be provided to NTSC/PAL encoder 116 and the audio decoder 136 generates the output digital audio data to be provided to digital-to-analog converters 118. Audio decoder 136 also generates the S/P DIF audio output stream. The following discussion describes functional units depicted in FIG. 4 relevant to the preferred embodiment in greater detail.

The host interface 124 preferably includes registers, read and write FIFO (first in first out) buffer is, and other logic (not shown) to permit the host microcontroller 104 to communicate with the audio/video decoder 120. Communication between the microcontroller 104 and decoder 120 preferably is through the use of the registers in the host interface 124, although other communication techniques can be implemented as well. In accordance with the preferred embodiment, the host microcontroller 104 writes video, audio, and configuration data and other status information to predefined registers and the host interface 124. The decoder 120 continuously or periodically monitors the registers for updated information and responds accordingly. Similarly, decoder 120 communicates information to the host microcontroller 104 through the use of the registers.

Referring still to FIG. 5, the channel interface 126 preferably accepts byte-wide MPEG data streams from the channel control demodulator ECC 110 (FIG. 4) over the CH_DATA[7:0] bus. The channel interface 126 indicates to the channel control demodulator ECC 110 that the channel interface 126 is ready to receive a new byte of encoded video or audio data. When the channel device 110 places the requested data on the CH_DATA bus, the channel device 110 asserts audio or video valid signals, a depending on whether the data to be transferred represents audio or video. These valid signals indicate that the requested data is available to the channel interface 126.

If desired, a DCK clock input signal may be provided to the channel interface 126. If implemented, the DCK signal preferably has a frequency of less than or equal to 9 MHz, although frequencies greater than 9 MHz can also be used. The DCK clock signal preferably is generated by the external channel device 110. The DCK clock signal, in conjunction with the valid signals, is used to write data synchronously to the channel interface 126. When the DCK clock input signal is connected to channel interface 126, the channel interface 126 uses the clock to synchronize the input valid signals before strobing the data into the channel interface 126. This method for inputting data into the channel interface 126 is preferred for connecting external channel devices 110 that do not have clean valid signals. Alternatively, the channel interface 126 can be configured for receiving audio and video data asynchronously. In the asynchronous mode, the DCK clock input pin preferably is grounded and the channel data is placed into the channel interface upon the assertion of request and valid control signals (not shown). As such, the data is not latched into the channel interface 126 synchronously with the DCK clock signal.

The channel interface 126 preferably also strips the packets of headers from the MPEG data stream and writes the header packet data payloads into separate buffer areas in memory 114. The host microcontroller 104 preferably defines a circular buffer within memory 114 by specifying the start and end addresses to each of the buffer areas in registers (not specifically shown). The channel interface 126 manages the reading and writing of each buffer defined in memory 114. When the channel interface 126 strips an item out of the bitstream, the decoder microcontroller 128 retrieves the current write location of the buffer area for that item and writes the item into the buffer.

The video decoder 130 generally receives MPEG video data from memory 114, performs "post-parsing" on the data, decompresses and decodes the data and stores the processed data back in memory 114 in video frame form. The post-parsing process strips off all header information and stores the header information in memory (not shown) for use in the decoding process. The channel interface 126 parses pack, system and packet headers from the MPEG bitstream and stores video packet payloads in memory 114. The preparsed video data is read from the memory 114 into the channel interface 126.

The video decoder 130, along with the decoder microcontroller 128, performs post-parsing by stripping the bitstream apart, and passing the appropriate bits and fields in the stream to the microcontroller 128 for use in picture decoding and reconstruction. The video decoder 130 also decodes layer of syntax in the MPEG bitstream starting from the sequence layer and going through all of the lower layers including the group of picture layer, picture layer, slice layer, macro block layer and block layer, all of which are known to those skilled in the art.

The video decoder 130 also decodes the block layer data per instructions received from the decoder microcontroller 128. The results are placed in the frame stores of memory 114 as picture bitmaps. The video interface 134 reads the picture data from memory 114, mixes it with SPU and OSD video and sends the mixed data to be external NTSC/PAL encoder 116 (FIG. 4). The video decoder 130 also includes buffers that are used to store certain parameters from each of the layers of syntax. The data in these buffers (not specifically shown) is available through the registers included in the host interface 124 described above. In general, this data is useful for controlling the decoder 130.

Referring still to FIG. 5, the SPU decoder 132 decodes SPU bitstreams as defined in the DVD Specification for Read-only Disk. The SPU decoder 132 preferably controls both the memory 114 buffer pointers and various on-chip FIFO pointers. Further, SPU decoder 132 analyzes each SPU command and controls the entire SPU decoding schedule as well as decoding the pixel data compressed by run-length encoding techniques.

The memory interface 138 preferably configures memory 114 into a 512×16-bit page size with a page break penalty of 6 to 7 cycles. The memory interface preferably also implements a column address strobe (CAS) latency of 3 and a burst length of 4. The memory bus 122 preferably comprises a 16-bit data bus, a 12-bit address bus, various chip selects signals and other control signals as would be understood by those of ordinary skill in the art. The memory 114 preferably includes at least one SDRAM device, but may include one or more additional SDRAM's as desired. Many types of data may be stored in memory 114. For example, OSD graphics data, audio and video data, MPEG system header channel data, SPU channel data, and Navi Bank or private stream channel data may be stored in memory 114.

In accordance with the preferred embodiment, the decoder microcontroller 128 controls arbitration to memory 114. Memory arbitration is required because various devices and processes may concurrently require memory access. The arbitration algorithm gives higher priority to some devices requesting memory access and lower priority to others. The arbitration priority preferably favors the MPEG video decoder 130 and channel interface 126. The next highest priority is given to the SPU decoder 132. The next lowest priority is given to the host interface 124, block data move transactions, and direct memory access (DMA) data transfers. Lastly, memory refresh is given lowest priority. Other arbitration schemes can be implemented if desired.

Because the preferred memory configuration is 16 bits wide, the memory interface preferably performs the conversion between the 16-bit memory bus 122 to the 64-bit internal data bus of the audio/video decoder 120. The host microcontroller 104 and the decoder microcontroller 128 address memory 114 assuming an 8-byte wide data transfer configuration. The memory interface 138 changes these addresses to suitable chip selects, bank selects, and column and row addresses for the memory 114.

Referring now to FIG. 6, the video interface 134 preferably includes a display control 230, an address generator 232, a vertical filter unit 234, a horizontal filter unit 236, a sub-picture unit (SPU) mixer 240, an on-screen display (OSD) mixer 242, and a timing generator 244. The address generator 232, under control of the timing generator 244, addresses the video frames stored in memory 114 to read pixel data into the post-processing filters 234, 236, and 238. The address generator 232 also commands display control 230 and reads OSD bitmap data into the OSD mixer 242. The post-processing filters 234, 236, and 238 modify the pixel data based on instructions from the display control 230 to perform various video operations such as "letter boxing," "3:2 pulldown, "pan and scan."

The display control 230 sets the location of the video image on the display 90 (FIG. 2) with respect to sync signals (not shown) to account for the requirements of several different timing systems and display modes. The output signal from horizontal interpolation filter 238 is then processed by SPU mixer 240 which adds SPU data from the SPU decoder 132 to the video data stream from filter 238.

The OSD mixer 242 mixes together the processed video data from SPU mixer 240 with an OSD image retrieved from memory 114. The output data stream from OSD mixer 242 is then provided to NTSC/PAL encoder 116 (FIG. 4).

The vertical filter 234 of FIG. 6 decimates an input image preferably by calculating weighted averages of luminance values ("lumas") from four lines of pixels. Although the technique described below can also be applied to decimating chrominance values ("chromas"), this step generally is not required because video frames are usually represented by lumas and chromas in a so called "4:2:0" format. The 4:2:0 format specifies one luma value for each pixel on the screen. Chroma components comprising Cr and Cb values, however, are only included for every other line of pixels. Thus, chromas generally do not need to be decimated for quarter screen decimation as the chromas can be used as is without reducing their number. However, if other types of decimation (for example, eighth screen decimation) is desired, the principles of the present invention can also be used for decimating chromas as well as lumas.

The quarter screen vertical decimation technique of the preferred embodiment assumes the input image to be reduced is represented in a field-based structure. Each frame of a video image represents all of the screen pixels (720× 480) at each instance of time. There is generally one frame of video data for each $\frac{1}{30}^{th}$ of second (i.e., 30 frames of video per second). In a field-based structure, each frame is represented by an "odd" field and an "even" field. The odd field comprises the odd lines of the frame (i.e., lines 1, 3, 5, 7, . . . , 479) and the even frame comprises the even lines (2, 4, 6, 8, . . . , 480 ). The odd and even fields are generally captured at different points in time. The even field represents the image at a time $\frac{1}{60}^{th}$ of second apart from the odd field. The preferred decimation technique assumes a field-based video representation, but will also work in a frame-based structure.

In accordance with the preferred embodiment, the vertical filter 234 of FIG. 6 implements averaging equations (1) and (2) below. Equation (1) is used to calculate the odd lines of pixels in the decimated image and equation (2) is used to calculate the even lines.

$$L_{odd,x} = \frac{34 * L_{2x-1} + 161 * L_{2x+1} + 64 * L_{2x+3} + (-3) * L_{2x+5}}{256} \quad (1)$$

$$L_{even,x} = \frac{18 * L_{2x-2} + 152 * L_{2x} + 88 * L_{2x+2} + (-2) * L_{2x+4}}{256} \quad (2)$$

The $L_{odd,x}$ and $L_{even,x}$ values on the left-hand sides of equations (1) and (2) refer to the luma values calculated for the decimated image in the odd and even fields, respectively, for a line number 'x'. For example, $L_{odd,1}$ refers to a luma value in line 1 of the odd field of the decimated image. Because the preferred embodiment is a technique for quarter screen decimation, the 480 lines of the original image are reduced to 240 lines in the decimated image. Thus, 'x' in equation (1) includes the range 1, 3, 5, . . . , 239 and the 'x' in equation (2) includes 2, 4, 6, . . . , 248.

The 'L' values on the right-hand side of equations (1) and (2) represent lumas from the original (undecimated) image. The preferred decimation technique involves the weighted average of four lumas from the original image to produce each luma in the decimated image. The luma values used in equations (1) and (2) represent lumas from different lines along a single column of pixels. Thus, a single application of the equations results in the computation of a single luma value in the decimated image. To compute all of the luma values in a line of the decimated image, equations (1) and (2) must be repeatedly applied.

The subscripts of the luma values on the right hand side of equations (1) and (2) refer to line numbers from the original image to be decimated. For example, calculating $L_{odd,1}$ (x=1 referring to line 1 in the decimated image) involves a weighted average of lumas from lines 1 (2*1−1), 3 (2*1+1), 5 (2*1+3), and 7 (2*1+5) from the original image.

In accordance with the preferred embodiment, after a decimated luma value is calculated using the equations (1) and (2), a line of lumas is skipped in the original image to determine the next set of four lines to use in the averaging equations. This step is best illustrated in Table I below.

TABLE I

Odd and Even Field Decimation

| Filtered output line # (odd field) | Lines to be averaged | Filtered output line # (even field) | Lines to be averaged |
|---|---|---|---|
| 1 | 1, 3, 5, 7 | 2 | 2, 4, 6, 8 |
| 3 | 5, 7, 9, 11 | 4 | 6, 8, 10, 12 |
| 5 | 9, 11, 13, 15 | 6 | 10, 12, 14, 16 |

As shown, for decimated image line 1, lines 1, 3, 5, and 7 from the original image are averaged together according to equation (1). For the lumas in decimated image line 3, lines 5, 7, 9, and 11 from the original image are averaged. Line 3 from the original image was skipped and thus is not used to calculate the next line of the decimated image (line 3). Line 3 from the original image, however, was used to calculate decimated image line 1 Similarly, the vertical filter 234 skips line 7 from the original image when calculating the next line (line 5) of the decimated image, although line 7 was used to calculate decimated image lines 1 and 3. Thus, four consecutive lines of the original image in each field are used in a weighted average calculation of each line in the decimated image. The next line of the decimated image is then calculated by averaging together the next set of four consecutive lines skipping a line as illustrated above in Table I. Other embodiments of the invention may include skipping lines in a different manner from that described above. Although lines from the original image are skipped, generally every line is used at least once, preferably at least twice, to compute lumas in the decimated image.

By skipping a line when determining the next set of four consecutive input lines to use in the averaging equations, the vertical filter reduces the vertical size of the input image by a factor of two resulting in quarter screen decimation. Alternatively, additional lines can be skipped if further image size reduction is desired. Further still, it is not always necessary to use four consecutive lines from a field of the input image when calculating each output line.

The coefficients used in equations (1) and (2) represent only one possible set of coefficients that can be used—other embodiments of the invention use other coefficients including evenly weighted coefficients. The coefficients used in equations (1), 34, 161, 74, −3, and equation (2), 18, 152, 88, −2, total 256 when added together and thus, after multiplying the input luma values by their corresponding coefficients and adding the products together, the result is divided by 256 to obtain the weighted average. The coefficients shown were chosen, in part, because they add to 256 and the corresponding division by 256 is easy to implement in a digital circuit. Dividing by 256 simply involves an eight bit right shift. Shifting is easy to implement with well-known shift registers (not specifically shown) or other devices.

The decimation technique preferably is implemented in the vertical filter 234 using well-known multipliers, adders and shift registers. Alternatively, the decimation process can be implemented in firmware executed by the decoder microcontroller 128 if desired.

As shown in Table I, each line of pixels from the original image is used to compute the decimated image. Further, almost all of the original lines are used at least twice in the averaging equations. Accordingly, the preferred decimation technique reduces the vertical size of an image but achieves high quality output images because every line of the original image is used to calculate lines in the output decimated image.

The above discussion is meant to be illustrative of the principles of the present invention. Numerous variations and modifications will become apparent to those skilled in the art once the above disclosure is fully appreciated. It is intended that the following claims be interpreted to embrace all such variations and modifications.

What is claimed is:

1. A video processing system for decimating a video input image including multiple lines of pixels, comprising:

a microcontroller;

a memory device coupled to said microcontroller and used to store the video input image; and a decimation device coupled to said memory device for receiving the video input image from said memory device, said decimation device reducing the size of the input image to produce a decimated image by averaging together at least two lines of pixels from the input image for approximately every line of pixels in the decimated image, wherein said input image is represented with an odd field and an even field and the decimation device averages lines of pixels from each field independently, wherein said decimation device calculates a weighted average of at least four pixels from four lines of pixels in the input image to produce a pixel in a line of pixels in the decimated image.

2. The video processing system of claim 1 wherein said decimation device multiplies each of said at least four pixels by coefficients that weight each pixel differently.

3. The video processing system of claim 1 wherein the decimation device calculates a weighted average of four pixels from four consecutive lines of pixels from each field.

4. The video processing system of claim 1 wherein each pixel is associated with a luminance value (luma) and said decimation device calculates a weighted average of four lumas, $L_n$, $L_{n+2}$, $L_{n+4}$, and $L_{n+6}$, where n represents a line number in the input image.

5. The video processing system of claim 4 wherein said decimation device skips a line of pixels from the input image when calculating each line of lumas in the decimated image.

6. The video processing system of claim 4 wherein said decimation device increments n by 4 when calculating each line of lumas in the decimated image.

7. The video processing system of claim 2 wherein said coefficients include approximately 34.

8. The video processing system of claim 2 wherein said coefficients include approximately 34 and 161.

9. The video processing system of claim 2 wherein said coefficients include approximately 34, 161, and 64.

10. The video processing system of claim 2 wherein said coefficients include approximately 34, 161, 64, and −3.

11. The video processing system of claim 2 wherein said coefficients include approximately 18.

12. The video processing system of claim 2 wherein said coefficients include approximately 18 and 152.

13. The video processing system of claim 2 wherein said coefficients include approximately 18, 152, and 88.

14. The video processing system of claim 2 wherein said coefficients include approximately 18, 152, 88, and −2.

15. A method for decimating a digital video image to produce a decimated output image, comprising:

retrieving pixel data values from at least two lines of pixels representing the input image;

calculating a weighted average of the pixel data values to compute a line of pixels in the decimated output image; and skipping a line of pixels in the input image when calculating a subsequent line of pixels in the decimated image, wherein said input image includes multiple video fields and said retrieving step includes selecting lumas from adjacent lines of pixels in each field, wherein said retrieving step includes retrieving lumas from four lines of pixels from each field and said calculating step includes calculating a weighted average of said lumas.

16. The method of claim 15 wherein said four adjacent lines of pixels include an initial line number and said method further includes incrementing said initial line number by four to skip a line from a field comprising the input image.

17. A video decoder for computing a reduced image, comprising:

a memory interface adapted to be coupled to a memory device in which an input image can be stored; and a vertical filter coupled to said memory interface for reducing the vertical size of the input image by computing an average of at least four lumas from four different lines in the input image and skipping lines in the input image when determining which lines to average together, wherein said vertical filter multiplies said four lumas by coefficients to produce a weighted average, wherein the input image is represented by an odd field and an even field and said vertical filter averages four lumas from four consecutive lines of a field of the input image.

18. The video decoder of claim 17 wherein said coefficients are approximately 34, 161, 64, and −3 for calculating weighted averages of lumas for the odd field.

19. The video decoder of claim 17 wherein said coefficients are approximately 18, 152, 88, and −2 for calculating weighted averages of lumas for the even field.

* * * * *